May 31, 1960                    C. E. CONKLIN                    2,938,272
                GAUGE APPARATUS AND A TRANSFER MECHANISM THEREFOR
Filed June 24, 1957                                           2 Sheets-Sheet 2
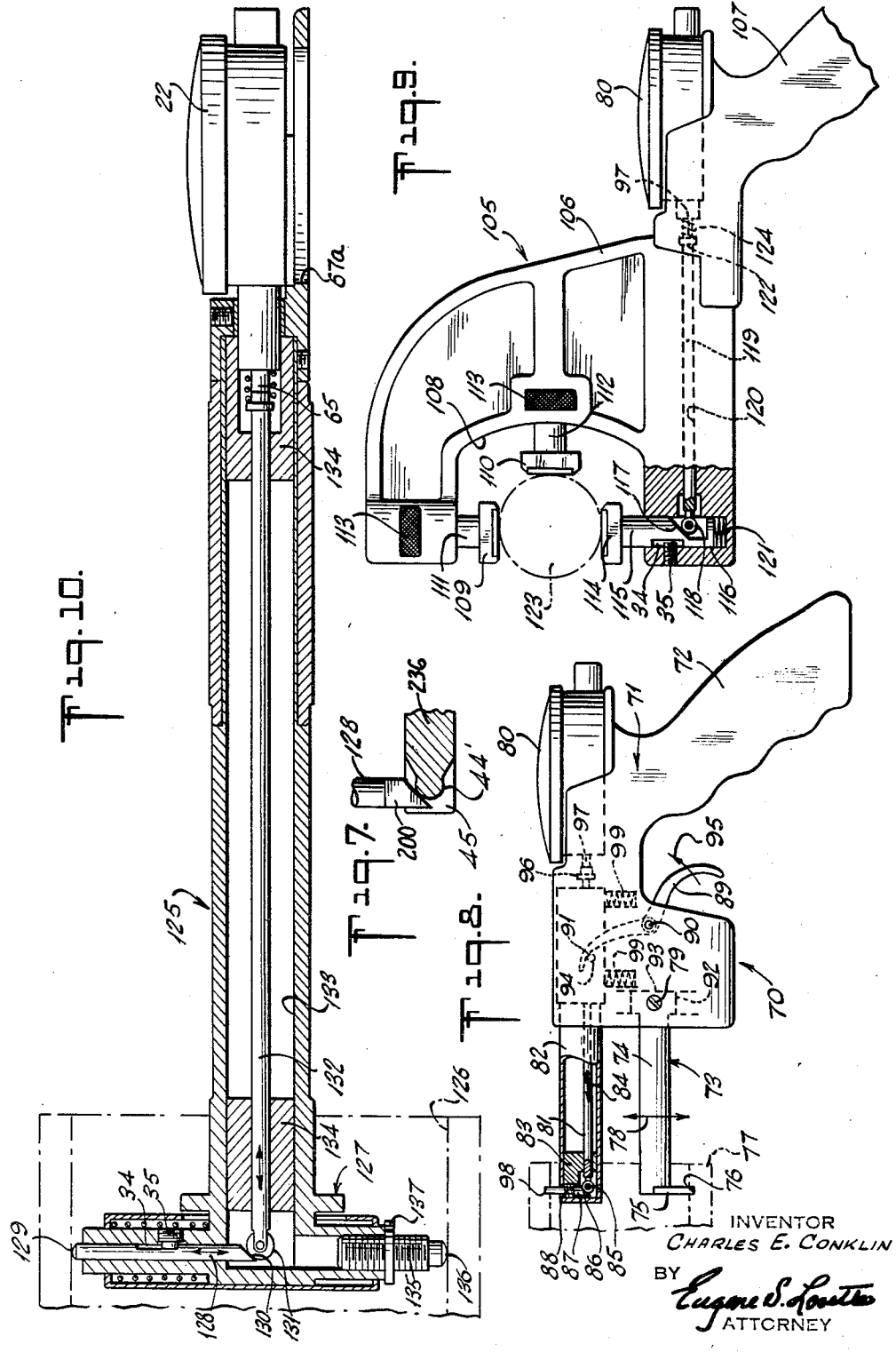
INVENTOR
*Charles E. Conklin*
BY
*Eugene S. Loretta*
ATTORNEY

United States Patent Office 2,938,272
Patented May 31, 1960

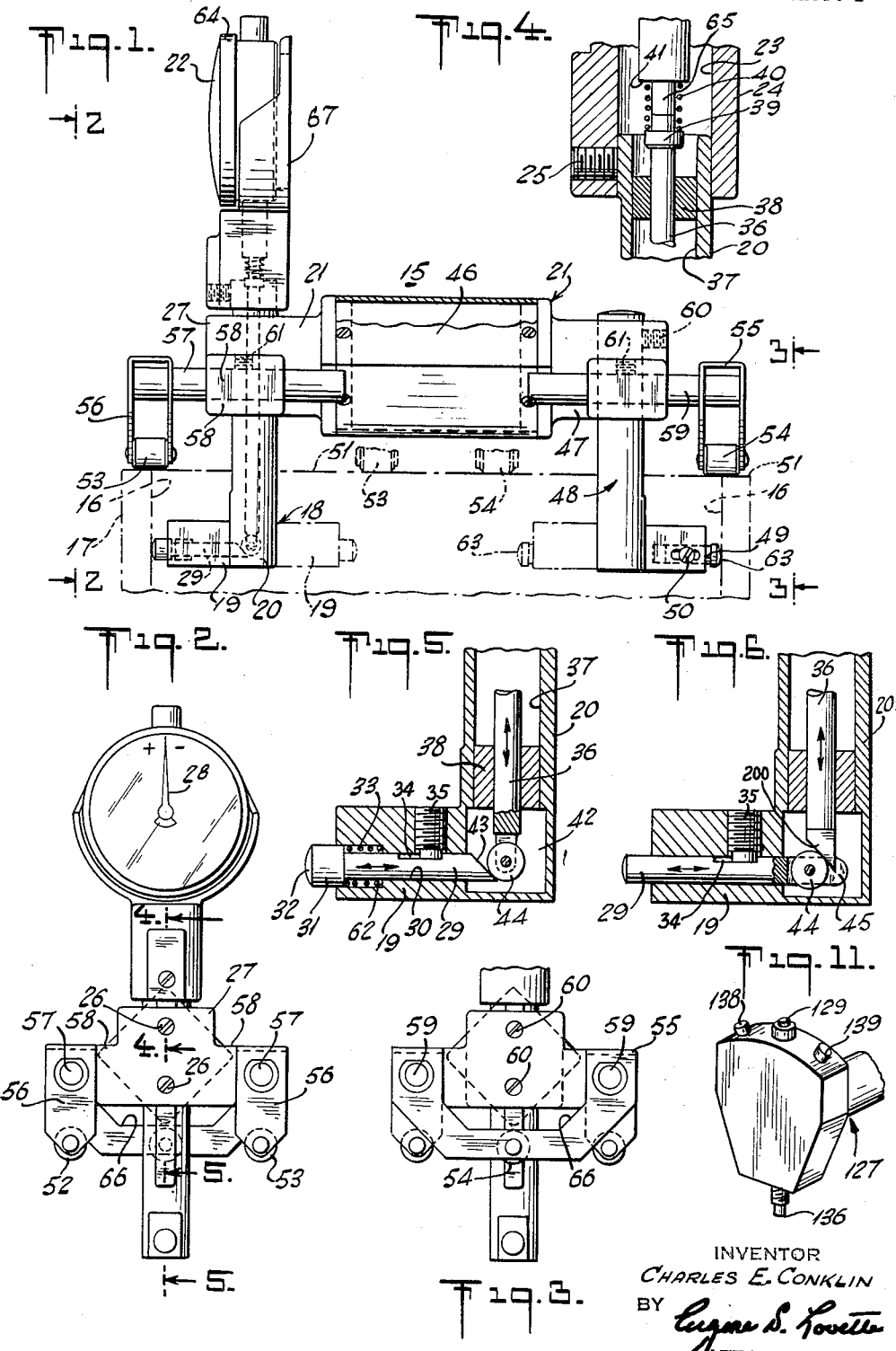

2,938,272

GAUGE APPARATUS AND A TRANSFER MECHANISM THEREFOR

Charles E. Conklin, Salt Point Turnpike,
Pleasant Valley, N.Y.

Filed June 24, 1957, Ser. No. 667,646

10 Claims. (Cl. 33—147)

The instant invention relates to improved gauge apparatus for measuring surface dimensions of workpieces and more particularly, to means for transferring linear motion along one axis to linear motion along a second axis displaced 90° from the first axis by means of axial displacements of engageable rod members such that movement of one displaceable rod along the first axis causes equal displacement of the second rod along the second axis, whereby movement of the second member causes an indicator response to provide improved accuracy in gauge measurements.

Attempts were made heretofore in gauges of the type contemplated herein to provide transfer mechanisms capable of converting linear motions imparted to one arm of the transfer mechanism to another arm of the mechanism in order to achieve accuracy and reliability of responses such that the gauge may be used in precision work. The transfer mechanisms generally resolved by prior art efforts employ ball bearing structures or other highly complex cam mechanisms to effect conversion of such linear motions. In addition to the complexity of these structures, the high cost to manufacture same, and the difficulty to assemble and disassemble same for repair purposes, it has been found that the prior art structures present about a 7% to about an 11% error in conversion of one linear motion to the other by virtue of the inherent characteristics of the transferring mechanisms. This increment of error reduces the effectiveness of the gauges in use of precision work and as a result, requires calibration or corrective measures upon the use of prior art gauges to insure accuracy during precision work.

Accordingly, it is the principal object of the instant invention to provide a novel transfer mechanism for use in gauges particularly suitable for precision work of the types described herein in which a linear axial movement is converted accurately and reliably to an equal linear movement along a second axis displaced 90° from the first axis, and thereby provides a true one-to-one conversion of such motions, and which transfer mechanism is simple to employ and offers economy of manufacture and in addition accuracy and reliability in use, and eliminates the need of conversion and corrective measures to achieve accuracy in measurements for precision work.

It is a further object of the instant invention to provide improved indicator gauge apparatus designed to reduce the complexity of gauges of such kinds, and in particular the complexity of its transferring mechanism; the improved gauge structure also providing features which minimize the wear of its component parts generally susceptible to frictional wear to afford long-life durability.

It is a further object of the instant invention to provide improved gauge apparatus incorporating adjustable means wherein the user can readily measure bore dimensions of a hole or groove at selected depths along the bore axis, and outside diameters of workpieces of large or small sizes, in like manner.

It is another object of the invention to provide improved measuring gauges which provide uniformity of measurements and wherein the gauges may be preset by a master or standard and then measurements taken of workpiece dimensions, such that indicator responses report directly and accurately deviations from the standard dimension without the need of calibrated corrections.

It is a further object of the instant invention to provide improved linear motion transfer mechanisms of the type described herein, which mechanisms and the advantages thereof can be readily applied to various types of gauges such as external, internal bore gauges for the measurement of large or small dimensions, groove gauges and outside diameter snap gauges.

It is a further object of the instant invention to provide improved gauge apparatus and a transfer mechanism therefor which provide ease in handling during use and allow full travel of the indicator used therewith.

Further objects and advantages will become apparent from the following description of the invention taken in conjunction with the figures, in which Fig. 1 is a side plan view, partly cut away and in section, showing an internal bore gauge employing the principles of the instant invention and adapted to measure generally bores of large diameters;

Fig. 2 is a front face view in elevation of the gauge shown in Fig. 1 taken along 2—2 of Fig. 1;

Fig. 3 is a fragmentary rear face elevation taken along line 3—3 of Fig. 1;

Fig. 4 is a fragmentary sectional view in elevation taken along line 4—4 of Fig. 2;

Fig. 5 is a fragmentary elevational view in section taken along line 5—5 of Fig. 2;

Fig. 6 is a fragmentary elevational view in section taken along line 5—5 of Fig. 2, but incorporating alternative structure in comparison to the structure shown in Fig. 5;

Fig. 7 shows the engaging ends of the transferring mechanism rods employing the principles of the instant invention;

Fig. 8 is a side plan view, partly cut away and in section, showing the application of the principles of the instant invention to an internal groove gauge;

Fig. 9 is a side plan elevation, partly cut away and in section, showing the application of the principles of the instant invention to an outside diameter snap gauge;

Fig. 10 is a longitudinal elevation cut away and in section, showing the application of the principles of the instant invention to a centralizing type of internal bore gauge; and Fig. 11 is a perspective view of the gauge shown in Fig. 10, illustrating certain features thereof not shown in Fig. 10.

Reference is now made to the drawings and in particular to Figs. 1 through 6, which figures illustrate a gauge 15 incorporating the principles of the instant invention. Gauge 15 is adapted to measure external or internal, relatively large parallel or tapered dimensions. In Fig. 1, gauge 15 is illustrated measuring an internal bore such as 16, in the order of 8 inches or greater, of a workpiece 17. Gauge 15 has an L-shaped arm 18 made up of a forwardly projecting horizontal finger or block 19, secured integrally by suitable means to a vertically disposed hollow tubular member 20. Tubular member 20 passes through a bore disposed in a forward end portion 27 of gauge frame 21 and extends upwardly beyond end 27 to support an indicator 22. As shown in detail in Fig. 4, the upper end of member 20 is recessed in a downwardly extending bore 23 of an indicator support frame 24 and is clamped thereto by set screw 25 extending threadedly through frame 24. Arm 18 may be adjusted vertically to increase or decrease the depth of penetration of finger 19 in bore 16 and then clamped in set position by set screws 26 extending threadedly through forward frame end 27.

Indicator 22 may be of the type in current use and is provided with the usual indicator hand 28 adapted to turn to the left or right in response to linear displacements in one or the other of two directions. Gauge 15 senses axial or diametrical dimensions of workpiece bore 16 by a pair of contact members, one of which is a movable contact member 29 slidably disposed and supported within a bore 30 in finger 19. Member 29 is rod-shaped and is provided with an enlarged forward end 31 disposed to project outwardly from an enlarged forward section of bore 30. Enlarged end 31 has a rounded contact surface 32 disposed to engage slidably along a portion of the bore surface 16. As shown in Fig. 5, a spring 33 under compression is disposed in the enlarged section of bore 30 and between the rear annular surface of enlarged end 31 and an interior annular wall 62 in order to return member 29 to its normal outwardly projecting position after being pushed horizontally to the right. As an alternative, spring 33 and the enlarged sections of member 29 and bore 30 may be omitted as shown in Fig. 6. Another spring to be described hereinafter may be relied upon as the sole means of returning the transfer mechanism to its normal position after use. A longitudinal keyway 34 is disposed along the periphery of member 29 and is engaged by the inner end of a dog screw 35 threadedly secured to finger 19. Engagement of dog screw 35 with keyway 34 prevents rotation of member 29 about its axis and determines the limits of axial displacement of member 29.

The remainder of the transfer mechanism includes a second movable member in the nature of a rod 36 disposed and supported for vertical movement within a bore 37 of tubular member 20. Upper and lower bushings 38 are press fitted adjacent the ends of bore 37. Bushings 38 are provided with centrally disposed holes through which rod 36 slidably fits. A small sleeve 39 is pressed on and secured to rod 36 near its upper end and serves as an abutment for a compressed spring 40 suspended between the juxtaposed surfaces of sleeve 39 and an annular fixed shoulder 41 of the indicator assembly. Spring 40 serves to return the transfer mechanism including rod members 29, 36 to normal position after being displaced by reason of measuring a bore surface.

The operatively engaging ends of the transfer mechanism rod members 29, 36 are located in a cavity portion 42 at the communicating ends of bores 30, 37. One engageable end is an accurately machined cam surface 43 inclined at 45° to the axis of displacement of the movable member. Fig. 5 shows cam surface 43 as an integral part of movable rod 29, whereas Fig. 6 shows cam surface 43 as an integral part of movable rod 36. The other engageable end of the transfer mechanism is a cam follower having a peripheral surface of constant radius and which may be a roller 44 journalled to roll up and down along cam surface 43. A longitudinally movable cylindrical pin 44' having a transverse arcuate cam surface as shown in Fig. 7 is supported at the end of movable member 236 and may be used in lieu of roller 44 as the cam follower. It is preferable to provide opposed spaced apart skirts 45 on one of the engaging ends of the movable members as shown in Figs. 6 and 7. In Fig. 6, skirts 45 are integral extensions of rod 29 and straddle the operatively associated end of rod 36. For this embodiment, the end of rod 36 is provided with suitable diametrically opposed flat portions 200 operatively confronting respective skirts 45 to prevent rotation of rod 36 about its own axis by reason of the fact that rotation of rod 29 is prevented by dog screw 35 engaging keyway 34. In Fig. 7, skirts 45 depend from rod 236 and the operatively associated confronting flat portions 200 are at the end of rod 128. Gauge frame 21 extends rearwardly and has a thin walled, hollow midportion 46 from which an end portion 47 extends rearwardly. End portions 27, 47 may be identical in structure and hence interchangeable. Mid-portion 46 may be shaped to form a diamond-shaped cross section as seen from Figs. 2 and 3, to facilitate handling of gauge 15 during use in measuring bore 16. The polygonal cross section for mid-portion 46 increases its rigidity and thus allows the use of a thinner gauge for the wall of the mid-portion.

The rearward end portion 47 of the frame is provided with a vertical bore to receive an L-shaped arm 48, which arm may be adjusted vertically, set to a desired depth of penetration in bore 16 and clamped thereat by set screws 60. Arm 48 has a horizontal axially adjustable contact 49 clamped by a set screw 50. Contact 49 has a rounded face 63 oriented to slide against a portion of bore 16 diametrically opposite the bore portion slidably sensed by contact surface 32.

Gauge 15 is supported to rest upon or roll on the exposed ledge 51 of workpiece 17 by means of rollers 52, 53, 54. Rollers 52—54 are journalled to roll along the plane of ledge 51 perpendicular to the axis of bore 16 under measurement. A pair of such rollers 52, 53 are journalled by respective roller brackets 56 at the forward end of gauge 15, which brackets in turn are each suspended from respective horizontal rods 57. Rods 57 extend through respective bores of spaced apart frame wings 58 extending integrally from frame end 27. Rear roller 54 is similarly supported by a bracket 55 mounted from horizontal rods 59 extending inwardly through respective bores in the wings 58 of rear frame end 47. Roller rods 57, 59 may be longitudinally advanced in either direction, to the left or right, within mounting bores therefor in order to adjust gauge 15 to roll upon ledges 51 of different sizes, and may be clamped to set position by accommodating set screws such as 61. Upon setting arms 18, 48 to a desired bore depth and adjusting rollers 52—54 to a desired spacing, gauge 15 may be disposed upon workpiece 17 as shown in Fig. 1, and upon suitably manipulating same, the diameter of bore 16 will be measured.

In the use of gauge 15, it is the general procedure to preset gauge 15 by a master standard, not shown, which standard provides predeterminedly dimensioned, spaced apart surfaces between which contact members 29, 49 are interposed. Contact 49 is axially adjusted and clamped by set screw 50. Indicator 22 then may be adjusted by well known means such as an adjustment mechanism 64 so that hand 28 reads a desired value, for example zero. Gauge 15 then is removed from the standard and inserted in bore 16 to be measured. If the diameter of bore 16 is less than the predetermined standard dimension, member 29 will be displaced axially to retract within bore 30 which will cause corresponding vertical motion of rod 36 upwardly as cam follower 44 rides along surface 43. Since cam face 43 is disposed at an angle of 45° to the axis of displacement of rod 29, it is seen that the transfer mechanism transfers linear horizontal displacement to equal vertical displacement of rod 36. The upper end of rod 36 bears against an indicator mechanism 65, as shown in Fig. 4, movement of which causes displacement of hand 28 in a direction to indicate the difference between the bore dimension and the predetermined standard dimension. Upon removal of gauge 15 from workpiece 17, compressed spring 40, or springs 33 and 40, depending upon how many are used, return the transfer mechanism to normal position. On the other hand, if the dimension of bore 16 is greater than the predetermined standard dimension, then contact member 29 will be displaced axially in the opposite direction to the extent permitted by bore 16 such that indicator hand 28 indicates a reading on the opposite side of zero.

It is within the scope of the instant invention to attach, in removable fashion by suitable means, mid-section 46 to the forward and rear frame ends 27, 47 to allow replacement by another mid-section of substantially the same cross section, but of longer or shorter longitudinal length as desired so that the overall frame structure 21 may be adjusted accordingly to allow measurements of bore diameters of stepped sizes.

It will be noted that the simplicity of the foregoing described gauge, and in particular the transfer mechanism, reduces to a minimum the complexity and number of structural components making up the gauge. In addition, the use of the foregoing described structure provides a gauge of relatively lighter weight and marked advantages with respect to increased economy of fabrication, ease of assembly and disassembly for quick repair. For example, the indicator frame 24 in which indicator 22 is bedded and the forward and rear frame ends 27, 47 may be made of cast aluminum. Rods 57, 59 may be made of hollow aluminum tubing, and mid-section 46 may be thin-walled steel tubing. Tubular member 20 may be made of a hollow steel tube in contrast to boring out a solid body as practiced heretofore, whereas finger 19 may be made of a suitably hollowed block of brass to provide a good bearing surface. Roller brackets 55, 56 may be made of sheet aluminum which are suitably shaped on progressive forming dies. Rod 36 is centralized by pressed fitted bronze bushings 38, 38. Furthermore, gauge 15 employs rollers such as 52, 53, 54 in order to reduce friction contact against the workpiece. The combination of all the above-noted design techniques reduces adverse friction effects and provides greater inherent structural strength and at the same time, overall light-in-weight gauge structure in comparison to prior art gauges. Further weight reduction can be achieved by opening the central portion of the back of frame 24 as shown in Fig. 10 at 67a.

It will be understood that gauge 15 may be easily adjusted to measure outside dimensions by reversing arms 18, 48 so that the anvil faces 32, 63 of contact members 29, 49 face each other as shown in dotted lines in Fig. 1. To accommodate this measurement, it also may be necessary to reverse rollers 52, 53, 54. Accordingly, rods 57, 59 are reversed in their respective mounting bores so that the rollers 52, 53, 54 are adjacently spaced apart between the opposed wings 58. For this arrangement, brackets 55, 56 are shaped with an edge 66 to provide a suitable U-shaped clearance for the bottom of mid-portion 46.

It will also be understood that foregoing described transfer mechanism will accommodate full indicator travel by selecting a suitable dimension for the 45° cam surface, that is to say, a suitable dimension for the hypotenuse of a right-angled triangle.

Fig. 8 illustrates a dial groove gauge 70 employing the principles of the instant invention for checking grooves inside a bore. In this instance, groove gauge 70 is provided with a gun-shaped frame 71 having a gripping handle 72. An L-shaped arm 73 extends outwardly from frame 71 and is provided with a longitudinal section 74 having at its outer end a suitably shaped contact member 75 oriented to engage slidably one side of a groove 76 under measurement in the bore of workpiece 77. Arm 73 may be provided with suitable interior means such as a guide 92 engaged by a track 93 to permit adjustment in either direction as indicated by arrow 78 and then clamped to set position by suitable means such as a set screw 79 extending threadedly through frame 71 to accommodate measurement of grooves 76 of various sizes. An indicator 80 similar to the one described hereinbefore, is nested in a bed and supported by frame 71. Indicator 80 responds to axial movement of a movable rod 81 suspended within an outer hollow arm 82 by bushings 83, one of which is shown in Fig. 8. Bushings 83 are provided with through passages through which rod 81 slidably extends such that rod 81 undergoes axial movement as indicated by arrow 84 in response to motion imparted thereto.

At its engaging end, rod 81 has a longitudinal pin 85 suitably oriented as noted hereinbefore, which pin serves as a cam follower engaging a 45° inclined cam face 86 of a suitably oriented axially displaceable rod 87, the second member of the transfer mechanism. Movable member 87 is designed to slidably fit within a bore section defined by the enclosed bushing 83 and the turned end wall of tubular arm 82. Member 87 has a smaller diametered contact end 98 extending through an opening in tubular arm 82, which contact is suitably shaped and aligned to engage slidably the groove section of groove 76 diametrically opposite the groove section sensed by contact 75. Member 87 is spring biased by a compressed spring 88 in order to return the transfer mechanism members 81, 87 to normal position.

A two-armed lever 89 is pivoted at 90 and defines a retraction trigger at one end and a cam bend 91 at its other end, which cam engages a pin 94 of an internal guide portion of tubular arm 82 such that motion of the trigger in the direction of arrow 95 causes tubular arm 82 to move downwardly to allow insertion or removal of arms 73, 82 with respect to the bore in which groove 76 is located. Arm 82 is biased by two springs 99 for return upon release of the trigger. Rod 81 continues through the interior portion of tubular member 82 and terminates at its interior end with enlarged thrust member 96 against which an indicator mechanism 97 slidably abuts. Although not shown herein, it will be understood that frame 71 is provided with a clearance slot to allow for a retracting movement of tubular member 82 upon operation of the trigger in order to insert or remove gauge 70 with respect to the bore of a workpiece. In operation, it will be understood that contact member 87 will be axially displaced in accordance with the groove dimension under measurement and by virtue of the one-to-one transfer provided by 45° cam face 86 and cam follower 85, equal linear displacement is imparted to rod 81, which in turn is registered by indicator 80.

It will be noted that handle 72 is disposed angularly a relatively small angle from the horizontal, i.e. the axis of rod 81 in order to require little if any wrist action during rocking of gauge 70 while in use. Displacement of handle 72 in this manner permits the user to use the gauge without discomfort or tiring effort.

Fig. 9 illustrates the principles of the invention as applied to an outside diameter snap gauge 105 in which a frame 106 is provided with a gun-shaped handle 107 and a U-shaped portion 108. An indicator 80 is suitably recessed in a bed provided in the frame 106. Two adjustable anvils 109, 110 are mounted on respective rods 111, 112 which rods are recessed in bores in frame 106 and are longitudinally adjusted by suitable means such as knurled nuts 113 in order to set anvils 109, 110 to a desired position in order to accommodate workpieces 123 of various sizes. Anvils 109, 110 have faces disposed to slide over a workpiece 123 at points 90° apart along the periphery of the workpiece. A third anvil 114 is carried at the end of an axially displaceable rod 115 projecting into an accommodating bore 116 in frame 106. Rod 115 has a 45° cam surface 117 operatively associated with a cam follower 118 disposed at the end of a second axially displaceable rod 119 extending slidably through a bore 120 in frame 106. A compressed spring 121 is disposed between the interior end of rod 115 and an end wall of bore 116 in frame 106 in order to return movable member 115 of the transfer mechanism to normal position. A second spring 124 functions similarly for member 119. The limits of axial movement of the transfer members are controlled by a stop mechanism comprising a longitudinal keyway 34 along the periphery of rod 115 engaged by a dog screw 35. The face of anvil 115 is disposed to slide over workpiece 123 along its periphery 180° opposite the face of anvil 109. The other end 122 of rod 119 suitably engages a member 97 of the indicator assembly in a manner as contemplated hereinbefore such that upon snapping gauge 105 over a workpiece 123, axial displacement of rod 115 causes equal displacement of second rod 119 in order to effect an indicator response. Again it will be noted that handle 107 is inclined a small angle from the horizontal to eliminate substantially tiring wrist movement during use of the gauge.

Figs. 10 and 11 illustrate the application of the instant invention to a self-centralizing dial bore gauge 125 for measuring the center line dimension of a workpiece bore 126. The transfer mechanism is housed in a hollow inverted T-shaped housing 127 and includes a first axially displaceable rod member 128 provided with an external contact surface 129 which surface is adapted to slide along the bore surface under measurement. Axial motion of the transfer mechanism is limited by a restrictor 35 and longitudinal slot 34 arrangement as noted hereinbefore. The interior end of rod 128 is provided with the 45° cam surface 130 engaged by a cam follower 131, which follower is journalled at the end of a horizontal and axially displaceable rod member 132 of the transfer mechanism. Rod member 132 of the transfer mechanism is coaxially supported within a bore 133 of the horizontal stem portion of housing 127 by a pair of bushings 134. The right hand end of rod 132 is substantially identical to the detail shown in Fig. 4 in order to engage the displaceable member 65 of the indicator assembly of an indicator 22, which indicator is supported from the right hand end of the tubular stem of housing 127.

The other short portion of housing 127 is provided with a threadedly adjustable contact member 135 provided with an external slidable contact face 136 in diametrical alignment with contact face 129. Contact member 135 may be adjusted axially and locked in position by means of a nut 137. Self-centering of gauge 125 is achieved by customary means such as a pair of bore surface contacts 138, 139 internally spring loaded within the head of housing 127. As seen from Fig. 11, the two centralizing contact members 138, 139 project from the forward face of the T-head of housing 127 and are spaced symmetrically on either side of rod 129, such that upon insertion of gauge 125 into bore 126, as shown in Fig. 10, the aligned contact members 128, 135 intersect the center line of bore 126. Accordingly, it is seen that upon insertion of gauge 125 into bore 126, axial movement of member 128 along a vertical axis as shown in Fig. 10 is converted to equivalent horizontal axial movement of rod 132, which brings about indicator response. Moreover, it will be understood for the purpose of description and claims, the terms anvil and contact member are interchangeable.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gauge for measuring dimensions of workpiece surfaces comprising, a frame structure having a plurality of interior axial bores joined at a common internal cavity wherein one of said bores is adapted to extend in substantial alignment with the dimension under measurement, a first and movable member supported for limited axial movement in said one bore and having an exposed end projection from said frame structure, said exposed end being adapted to engage slidably a workpiece surface under measurement, a second member having an exposed end adjustably fixed for slidably engaging a portion of said workpiece surface diametrically opposite the surface engaged by said first exposed end, a second movable member supported in another of said bores for axial movement substantially perpendicular to motion of said first movable member, indicating means for registering displacements in response to movement of said second movable member, said movable members having operatively associated portions projecting into said cavity which portions are in operative engagement, one of said operatively associated portions being a cam surface terminating in a plane disposed 45° with respect to the axis of movement of its member, the other operatively associated portion having means for travelling along said cam surface, and opposed skirts integral with an operative portion of one of said movable members and flanking the operative portion of the other movable member, said other movable member having flat portions operatively confronting respective skirts and adapted to prevent rotation of either member with respect to the other, whereby linear axial movement of said first movable member effects substantially equal axial movement of said second movable member in order to register indicator responses.

2. Apparatus as defined in claim 1 further including means preventing one of said movable members from rotating about its axis of displacement, whereby rotation of said movable members about their respective axes is prevented.

3. Apparatus as defined in claim 1, said other of said operatively associated portions including a cylindrical surfaced body having a longitudinal axis disposed substantially parallel to said cam surface wherein the outer periphery of said cylindrical surfaced body is disposed to slide along said cam surface.

4. Apparatus as defined in claim 1 wherein, said other of said operatively associated portions includes a revolvable cylindrical roller the axis of which extends substantially parallel to said cam surface, the outer periphery of said cylindrical roller being disposed to roll along said cam surface.

5. A gauge for measuring surface dimensions of work pieces comprising, a frame structure having spaced and opposed end portions, a longitudinal and hollow thin-walled mid-section interconnecting said end portions, said mid-section being polygonal in cross section, each of said end portions having a through bore, a pair of L-shaped members, each L-shaped member having its longer arm slidably supported in an individual through bore of each end portion, a first of said L-shaped members having a plurality of interior axial bores joined at a common internal cavity wherein one of said bores is adapted to extend substantially in alignment with the dimension under measurement, a first movable member supported for limited axial movement in said one bore and having an exposed end projecting externally from said frame to engage slidably a workpiece surface under measurement, a second movable member supported in another of said axial bores for axial movement substantially perpendicular to motion of said first movable member, the second of said L-shaped members having the shorter one of its arms defining an exposed end adjustably fixed for slidable engagement along said workpiece surface diametrically opposite the surface engaged by said first-mentioned exposed end, spaced bearings in said another axial bore for slidably supporting said second movable member, the slidable contact provided by said bearings being along relatively small peripheral surface areas of said second movable member in comparison to its overall axial peripheral surface, said L-shaped members being axially and rotatably adjustable in their respective through bores, and indicating means supported by said frame structure for registering displacements in response to movement of said second movable member, said movable members having operatively associated portions, one of said portions being a cam surface terminating in a plane angularly disposed 45° with respect to the axis of movement of its member, the other operatively associated portion having cylindrical means for travelling along said cam surface, whereby axial movement of said first movable member effects substantially equal axial movement of said second movable member in order to register indicated responses.

6. Apparatus as defined in claim 5 wherein, said movable members are rods, one of said rods having a longitudinal slot along its periphery, and a set screw is threaded through said structure and has an inner end within said slot in order to prevent rotation of said one movable member and to determine the range of axial movement of said rods.

7. Apparatus as defined in claim 5 further including, opposed spaced skirts integral with the operatively associated portion of one of said movable members, said skirts flanking the operatively associated portion of the other of said movable members, said other movable member having flat portions operatively confronting respective skirts and adapted to prevent rotation of either member with respect to the other.

8. A gauge for measuring surface dimensions of workpieces comprising a frame structure having a plurality of interior axial bores joined at a common internal cavity wherein one of said bores is adapted to extend substantially in alignment with the dimension under measurement, a first and movable member supported for limited axial movement in one of said bores and having an exposed end projecting externally from said frame to engage slidably a workpiece under measurement, a second member carried by said frame and having an exposed end adjustably fixed for slidable engagement along a portion of said workpiece surface diametrically opposite the surface engaged by said first exposed end, a second movable member supported in another of said bores for axial movement substantially perpendicular to motion of said first movable member, spaced bearings in said another axial bore for slidably supporting said second movable member, the slidable contact provided by said bearings being along spaced and relatively small peripheral surface areas of said second movable member in comparison to its overall axial peripheral surface, said frame structure also having spaced and opposed end portions interconnected by a longitudinal and hollow thin-walled mid-section, said mid-section being polygonal in cross section, said end portions having parallel through openings, bracket rods slidably mounted within respective ones of said last-mentioned through openings, a roller bracket carried by said rods from each end portion, said brackets having an intermediate U-shaped recess to provide clearance for the mid-section of said frame structure, spaced rollers journalled by said brackets in order to roll along a workpiece surface in a plane substantially parallel to the dimension under measurement, said rods being axially adjustable and also being reversible in the openings therefor.

9. Apparatus as defined in claim 8, said frame end portions having parallel disposed through openings, bracket rods adjustably fixed and carried in said through openings, a roller bracket carried by correlated ones of said rods at each end of said frame, said brackets having an intermediate U-shaped recess to provide clearance for the polygonal mid-section of said frame structure, and rollers journalled by said brackets and adapted to roll along a workpiece surface in a plane substantially parallel to the dimension under measurement.

10. Apparatus as defined in claim 9 further including, opposed spaced skirts integral with the operatively associated portion of one of said movable members, said skirts flanking the operatively associated portion of the other of said movable members, said other movable member having flat portions operatively confronting respective skirts and adapted to prevent rotation of either member with respect to the other.

References Cited in the file of this patent

UNITED STATES PATENTS

| | | |
|---|---|---|
| 1,431,613 | Wittner | Oct. 10, 1922 |
| 2,216,795 | Aller | Oct. 8, 1940 |
| 2,424,497 | Nilsson | July 22, 1947 |
| 2,512,986 | Woodcock et al. | June 27, 1950 |
| 2,560,203 | Alderborgh | July 10, 1951 |
| 2,679,107 | Gondek | May 25, 1954 |
| 2,810,200 | Delaney | Oct. 22, 1957 |

FOREIGN PATENTS

| | | |
|---|---|---|
| 376,368 | Germany | May 28, 1923 |

OTHER REFERENCES

Publication, American Machinist, March 19, 1951, page 202. (Copy in Library), shows a pistol grip groove gauge.